United States Patent [19]

Park et al.

[11] Patent Number: 5,664,075
[45] Date of Patent: Sep. 2, 1997

[54] PRINT JOB IDENTIFICATION AND SYNCHRONIZATION BETWEEN NETWARE PSERVER AND ATLAS RPRINTER PROTOCOL GATEWAY

[75] Inventors: Jun S. Park, Torrance, Calif.; Jack W. Tung, Hsin-chu, Taiwan

[73] Assignee: Xerox Corporation, Stamford, Conn.

[21] Appl. No.: 543,888

[22] Filed: Oct. 17, 1995

[51] Int. Cl.$^6$ .................................................. G06F 15/00
[52] U.S. Cl. .................................................................. 395/114
[58] Field of Search .................................. 395/101, 109, 395/112, 114, 117, 118, 200.14, 200.06, 500, 708, 774, 105, 106, 111, 200.01, 200.02, 200.03, 200.17, 200.19, 297, 845; 371/32; 375/200; 358/407, 408, 409; 400/61, 62

[56] References Cited

U.S. PATENT DOCUMENTS

| | | | |
|---|---|---|---|
| 5,220,674 | 6/1993 | Morgan et al. | 395/800 |
| 5,224,095 | 6/1993 | Woest et al. | 370/85.12 |
| 5,323,393 | 6/1994 | Barret et al. | 370/85.8 |
| 5,528,621 | 6/1996 | Heiman et al. | 375/200 |
| 5,548,728 | 8/1996 | Dahuni | 345/200.14 |

*Primary Examiner*—Joseph Mancuso
*Assistant Examiner*—Gabriel Garcia

[57] ABSTRACT

A process for enabling a printer to separate print jobs while using a protocol for receiving page description data that does not have an end-of-file indicator defined. It is assumed that the each job received by the printer has a first packet with a size of 1 byte, and a content of one null character, a number of data packets having 512 bytes each, and a last packet having the remainder of the bytes of the job which usually will number between 1 and 512 bytes, exclusive. This process also assumes that the printer can send a status packet back to the originator of the data packets, a print server, verifying the receipt of a packet. The system now can generate a hard stop between jobs by having the printer verify the receipt of the previous packet for every current packet received, resulting in a flow of status packets back to the server that is one packet out of phase. After sending out the last packet of a job, the server will wait until that last packet is verified, before sending out the first packet of the next job. When the printer has waited a predetermined amount of time, it will time out, and verify the last packet received. In addition, the content of each packet is inspected to see if it between 1 and 512 bytes. The system will determine that the end of a job has been reached if the current packet size is between 1 and 512, there is a timeout and the system is in the middle of a print job data transfer, or if a new job is detected in the middle of a job data transfer.

1 Claim, 2 Drawing Sheets

PRINT JOB IDENTIFICATION AND SYNCHRONIZATION BETWEEN NETWARE PSERVER AND ATLAS RPRINTER PROTOCOL GATEWAY

BACKGROUND OF THE INVENTION

A protocol for separating jobs at a printer which is receiving a print job (file) from a network that does not provide job separation data, the job separation being based on delays in the delivery of the packets and the probable existence of a partial packet at the end of a job.

The NetWare (a network operating system for use in a PC environment) RPrinter is a network application layer protocol designed to receive a data stream from a NetWare print queue, managed by a PServer (a print server) program, to a network connected print device. This PServer has no concept of jobs, as is typical in the low end printing environments, it simply pushes data down to the remote printer. Thus, there is no job synchronization facility, such as an end of file indicator defined in the protocol. For a high end print service, job is a fundamental manageable entity of the system, and elaborate job management and spooling facilities are the key value-added features in the architecture. Although the concept of job exists in the NetWare print queue, the notion is generally lost through the stream based RPrinter protocol. Thus, there is no job synchronization facility, such as an end-of-job indicator, defined in the protocol. What is needed is a method of getting the printer to separate jobs while using a protocol that does not have an end-of-job signal.

SUMMARY OF THE INVENTION

To detect job boundaries at the receiving end of the RPrinter protocol, an out-of-phase technique was invented to synchronize print jobs with the NetWare PServer. In addition, the existence of a partially filled packet is also used as an end-of-job indicator.

Based on the RPrinter specification, the PServer is responsible for delivering jobs from the NetWare print queue to the RPrinter on a packet by packet basis. It will continue to do so as long as there is at least one job in the queue ready to be printed and RPrinter consumes the data successfully. Job transmission will be halted, however, if RPrinter indicates packet reception is incomplete.

Normally, RPrinter is expected to report progress back to the PServer on a packet basis via the status packet. The state of the status packet can either be finished or not finished, it is the only feedback channel from RPrinter to PServer. The mechanism used to force the PServer to halt between print jobs is to create an out-of-phase status return packet in the RPrinter. This mechanism to force the PServer to halt between print jobs can be explained as follows.

When the first (new job) packet is received at the printer, no return status packet is sent. When the second (data) packet is received, the first one is acknowledged, which sets up an out-of-phase situation. Thereafter, as each packet is received, the previous one is acknowledged. Finally, when the last job packet is sent, and the next-to-last is acknowledged, the PServer will stop sending packets. The printer will then time out, waiting for the next packet, and send an acknowledgement status packet back to the RPRinter for the last packet received. The RPrinter will see the timeout, interpret it as an end-of-job indication, send the status packet for the last one and prepare for the next job, and the PServer will interpret the timeout as the acknowledgement of the end of a job, and start the transmission of the start of the next job. In this way there is created a hard stop, and separation, between jobs.

However, if RPrinter depends solely on the forced timeout mechanism, job splitting or merging may occasionally occur if NetWare PServer fails to create a hard stop between print jobs. This problem happens frequently, especially when there are multiple print jobs queued in a Novell print queue, which makes the RPrinter gateway protocol unreliable. To prevent this, the size of the incoming packet is inspected to further enhance the detection of the start of a print job, thus clarifying the job boundaries and keeping its integrity.

Normally, the size of a data packet is 512 bytes. If a packet is between 1 and 512 bytes, it is highly probable that this packet is the last in a job unless there was a problem in the network during data transmission. Therefore, the RPrinter protocol declares the end-of-job transmission in two cases. The first case is when the size of the packet is between 1 and 512 bytes, there is a timeout and it is in the middle of a data transfer. This is usually the case when there is only one job in the Novell print queue.

In the second case, the method of testing for the end of a job is to inspect the next packet. The PServer will send the first packet which can be detected by the RPrinter. The first packet of a new job has a size of 1 and the content of the packet is one null character. If a packet is shown to be a first packet, then the printer knows that a new job has started. These are the only two cases that the printer takes as indications that a new job must be started.

The only time that this method may fail will be the situation where a false timeout has created a timeout generation due to some network problem, the size of the previous job packet happens to fall between 1 and 512 bytes, and the size of the last packet is exactly 512 bytes, which occurs rarely. In fact, testing has shown that this resultant protocol which uses the out-of-phase method and also inspects for a partial packet is highly reliable.

DETAILED DESCRIPTION OF THE INVENTION

Figure 1:
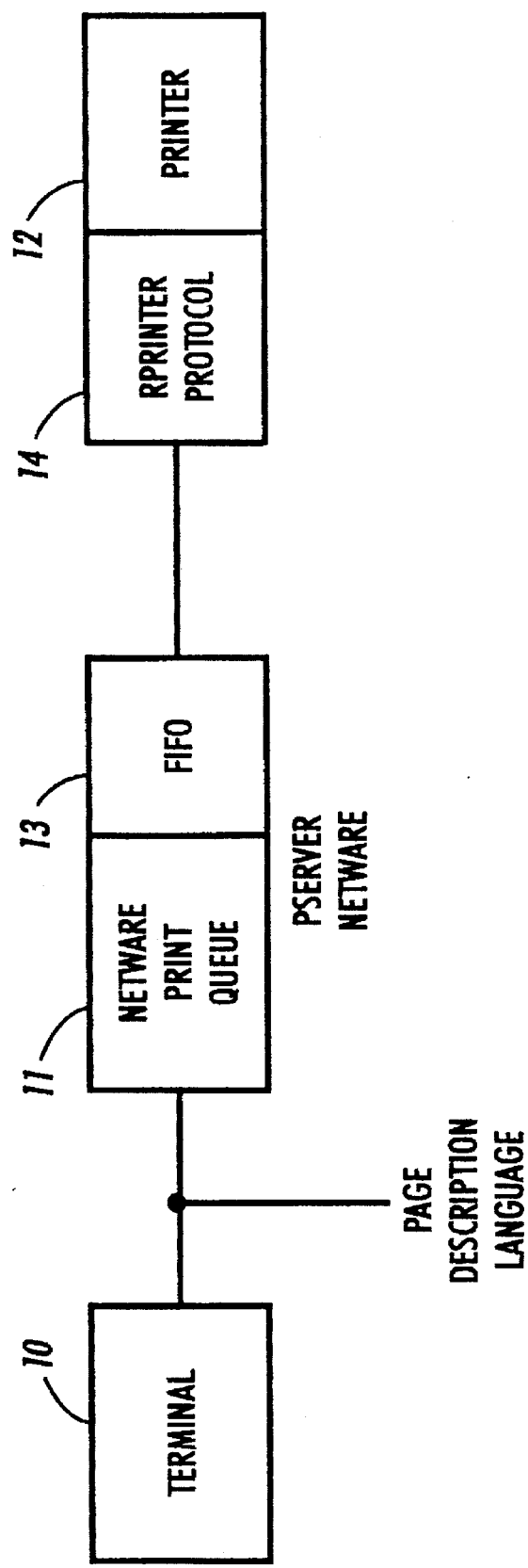
FIG. 1 is a block diagram of the system.

FIG. 1 is a block diagram of the overall system. A user at a terminal 10 generates a document in page description language (PDL), which is sent over the network to a print queue 11. Here the PDL is loaded into a first in, first out (FIFO) register and is then transmitted to the printer using the RPrinter protocol. The PDL is separated into jobs at the terminal, and the printer may recognize and be able to produce separate jobs, but the RPrinter protocol does not have the capability of passing along job separation information.

Figure 2:
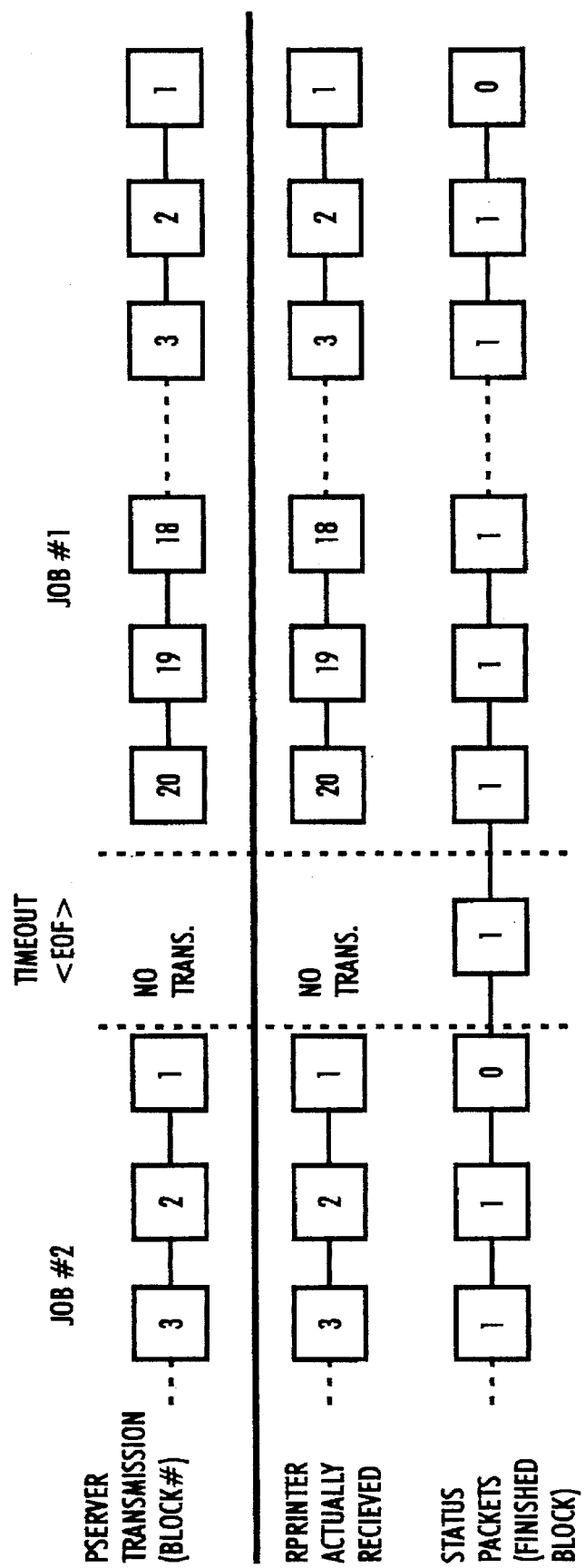
FIG. 2 is a timing diagram of packet transmissions.

One method of passing along job information involving the out-of-phase acknowledgment of the receipt of packets is shown in FIG. 2. Reading from right to left, when the PServer sends out block 1, and the RPrinter receives it, the status packet sent back to the PServer will not indicate a finished packet. For subsequent packets 2, 3, 4, etc, acknowledgments will be sent back. Thus, the status packets will always be one packet out of phase.

After the PServer has sent out the 20th packet, and has received an acknowledgement for the 19th, the PServer will not send out any more packets until the RPrinter has timed out, at which time the printer will acknowledge the last packet. The RPrinter will interpret the timeout as an end-of-job indication, will send the last packet, and will indicate that the printer should finish printing the current job and prepare to start a new job. In this way the printer can separate jobs without an explicit end-of-job signal.

However, the forced timeout mechanism alone can not clearly define the job boundaries. In fact, when multiple jobs are stored in the Novell print queue, the NetWare PServer quite frequently continues to send the next print packets without creating a hard stop between jobs. When this occurs, the next print job will be appended to the previous job, and will appear as one job at the printer, rather than two. On the other hand, if a network experiences a false timeout during the data transfer, a single print job will be split into two.

As an additional way of separating jobs, the first packet of a new job is used to signal the printer that a new job is starting. This new job packet has a size of 1, and the content of the packet is a null character. The RPrinter uses this information to detect the start of a job, and if the printer recognizes the receipt of this packet, it will start a new job. Another potential problem is the failure of the printer to detect this start-of-job packet, and merge two jobs.

As a final test, the size of the incoming packet is inspected to guess whether it is an ending packet. The normal size of a data packet is 512 bytes, and the last packet in a transmission is normally partially filled with the remaining bytes. Therefore, when a packet size is between 1 and 512 bytes, it is highly probable that this packet is the last unless there was a problem in the network during data transmission. With these factors in mind,, the RPrinter protocol only declares the end of job transmission in two cases. The first case is when the size of the current packet is between 1 and 512, there is a timeout, and the previous packet receipt resulted in an ordinary data transfer to the printer. This is usually the case when there is only one job in the Novell print queue. The second case is when the data stream type of the incoming packet is the new job and the previous packet receipt resulted in an ordinary data transfer to the printer. This is the typical case when multiple print jobs are stored in the Novell print queue.

The case where this method will fail will be the situation where a false timeout was created due to some network problem, the size of the previous job packet happens to fall between 1 and 512 bytes; and the last packet size is exactly 512 bytes, which rarely occurs.

This program, expressed in pseudo code, is as follows.

```
NewPacket=False; /*Set to "True" if received packet is the new job
  packet*/
  FirstDataPacket=False; /*Set to "True" if received packet is coming right after
    the new job packet. This is the first packet containing job data. */
  LastPacket=False; /* Set to "True" if size of the received packet falls between 1
    and 512. It is very likely that this is the last packet of data transmission */
  MiddleOfTransfer=False; /*Set to "True" if RPrinter is in the middle of a print
    job data transfer.*/
  TimeOutBlocksCount=1; /* Number of "out of phase" block. Set to "0" when
    reaching the end of file.*/ Create out of phase by 1 packet
while (No Problem)
  send the status packet to PServer;
  check for any incoming packet;
  if(!IncomingPacket)[[/* if there is no incoming packet or if there is a forced
      timeout */
    check SPX connection; /* check if the connection is still valid */
    /* decrement TimeOutBlocksCount when there is a halt during data transfer */
    if(middle of transfer && TimeOutBlocksCount GT 0)
      TimeOutBlocksCount--;
    *end-of-file- detected due to time out */
    if(lastPacket && (TimeoutBlocksCount ==0)&&MiddleOfTransfer)
      finish data transfer and reset variables;
    else if (!MiddleOfTransfer) CheckOAmessages;
    continue;
  else [/* if there is a packet coming in */
    check for virtual printer;
    receive the packet and inspect the size;
    if (1 LT PacketSize LT 512)
      LastPacket=True;
    else ((PacketSize==1)&&(PacketContent==NULL))
      NewPacket=True;
    /* Check Data Type and handle accordingly */
    DataType=GetStreamDataType();
    if(DataType!=5)&&(NewPacket==True))
      DataType=5; /* if GetDataStreamType() misses new job packet, set it
        here*/
    switch (DataType)[
      case 0: /*Normal data transfer*/ break;
      case 1: /*stop printing and clear all buffers*/continue,
      case 2: /*stop printing and wait for new instruction */ continue;
      case 3: /*restart printing from buffer */ continue;
      case 4: /*print data from sideband packet at once */ continue;
      case 5: /*Check for any existing job transfer */
        if(MiddleOfTransfer) /* end-of-file detected due to new job packet */
          finish data transfer and reset variables;
        /* start a new job */
        else[
          check for virtual printer;
```

```
        create new job and FIFO, and set variables;
        FirstDataPacket=True;
    ]
    continue;
    case 6: /* gives control of the Remote Printer to other process */ continue;
    case 7: /* reclaims control of the Remote Printer */ continue;
    default: /* unknown data stream type */
/* end of switch statement */
Create out of phase for the first data packet;
if(FirstDataPacket==True)]/*this is the first packet containing job data
packet */
    check for CTRL D and NULL for the first byte;
    initialize data transfer;
    set job attributes;
    set PDL format;
    FirstPacketData=False;
]
TransferData();
check for error and set variable, NoProblem;
[ /* end of while loop */
```

The program is initialized with the setup of several binary flags. NewPacket will normally be set to false, but will be true if the last packet received is the first packet of a new job. That is, if the packet size is "1" and the content is null. FirstDataPacket will normally be false, but will be set true if the current data packet is the first data packet of a new job. LastPacket will normally be false, but will be set to true if the received packet has between 1 and 512 bytes, indicating the probability that the current packet is the last data packet of a job. MiddleOfTransfer will be set false except when the current packet is between the first and last packet of a job. TimeOutBlocksCount will be an indication of how far out of phase the packet count is. It will normally be 1 packet out of phase during the middle of a job and equal to zero after the timeout.

The program begins with a "while" loop, which will continue as long as there is no incoming packet and there is no problem in the connection. The first step is to send a status packet to the Novell PServer to acknowledge the last packet received and then wait for the next incoming packet to arrive. If there is no incoming packet, (which includes the possibility of there being a timeout), the SPX connection is checked to make sure it is connected correctly. Then, when there is a timeout, the TimeOutBlocksCount which was set to 1 during the middle of a transfer is reset to 0. If, also, LastPacket is true (the last packet had between 1 and 512 bytes), and the job had previously been in the middle of transfer, then the job is finished. The program will continue around this while loop until a packet arrives.

If the "check for any incoming packet" shows that "there is a packet coming in", then the program will start through the second part, check to ensure that there is a printer available (on line or off line), receive the packet and check its size. If the packet size is between 1 and 512 bytes, then the LastPacket is set true to indicate that this is probably the last packet of the job. However, if the packet size is 1 byte and the packet content is a null, then the packet must be the first packet of a new job and NewPacket is set to true.

Next, the packet header is tested to determine what type of data is contained in the packet.

Case 5 is for a new job packet. If MiddleOfTransfer is true, meaning that the timeout process did not work and the printer does not know that the previous packet was the end of the old job, and a new job packet is received, the previous job will be ended and a new job started for the current packet. Else, if the old job was finished, then the program checks the status of the printer, creates a new job, initializes the FIFO, sets the FirstDataPacket flag to true and continues (back to the "while" statement).

If it is case 0, a normal data transfer, the program will break to the end of the switch statement. First there is a test to see if FirstDataPacket is true, which would mean that the previous packet was a new packet containing a null. Since the new job packet does not contain any data, RPrinter also has to detect the first data packet in order not to transfer the unnecessary Null character which is the data portion of the new job packet, and also not to initiate data transfer if any problem arises in creating a job and making the FIFO available. In addition, RPrinter uses the first data packet to initialize data transfer, to set job attributes, to set PDL format, and to check the null character for the first byte. Finally the FirstDataPacket flag is reset to false so that the process does not repeat the specific process for the first data packet.

If the FirstDataPacket was not true, the packet is a normal data packet, the program will transfer the data, check for errors, set variables, and then go back to the first loop to start looking for the next packet.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method for controlling a printer to separate a single stream of data comprising packets having n bytes of data generated by a means for generating page description language and coupled through a circuit that does not transmit job separation data into separate jobs to be printed, comprising the steps of:

creating two separate jobs from one stream of data, each job comprising 1 or more data packets having a plurality n of data bytes per packet, and a last packet having a remainder of from 1 to n data bytes, the stream of packets being defined at any moment as one or more previous packets, a current packet and a next packet, as each current packet is received by said printer, using said printer to generate a status signal to be transmitted to said means for generating to indicate that a previous data packet has been received, using the means for generating to stop sending data packets after said last packet of said first job is sent, using said printer to generate a timeout after a predetermined amount of time has elapsed since the receipt of said current packet, and to generate a status signal to be transmitted to said means for generating to indicate that said current data packet has been received, and using the printer to finish the current job after printing the current data packet, and to start a new job with the next packet a) if the previous packet was a data packet having n bytes, the current packet has between 1 and n bytes and there is a timeout, or b) if the current packet is a first packet and there was no timeout after the previous packet.

* * * * *